United States Patent
Nelson et al.

(10) Patent No.: US 8,395,274 B2
(45) Date of Patent: Mar. 12, 2013

(54) INTEGRATED POWER UNIT AS ENERGY STORAGE DEVICE FOR ELECTRICAL POWER SYSTEM

(75) Inventors: Jeffrey D. Nelson, Belvidere, IL (US); Hayden M. Reeve, Hartford, CT (US)

(73) Assignee: Hamilton Sundstrand Corporation, Rockford, IL (US)

( * ) Notice: Subject to any disclaimer, the term of this patent is extended or adjusted under 35 U.S.C. 154(b) by 815 days.

(21) Appl. No.: 12/386,202

(22) Filed: Apr. 15, 2009

(65) Prior Publication Data

US 2010/0264724 A1    Oct. 21, 2010

(51) Int. Cl.
*F01D 15/10* (2006.01)
(52) U.S. Cl. ......................................... 290/52
(58) Field of Classification Search .................. None
See application file for complete search history.

(56) References Cited

U.S. PATENT DOCUMENTS

| | | | | |
|---|---|---|---|---|
| 4,680,933 A | * | 7/1987 | Bozung et al. | 60/608 |
| 4,745,755 A | * | 5/1988 | Kawamura | 290/52 |
| 5,886,417 A | * | 3/1999 | Oka et al. | 290/52 |
| 6,153,943 A | * | 11/2000 | Mistr, Jr. | 290/52 |
| 7,336,000 B2 | * | 2/2008 | Stahlhut et al. | 290/52 |

OTHER PUBLICATIONS

Mike Koerner et al., A Turbine-Driven Electric Power Generation System for Launch Vehicles & Other High-Power Aerospace Applications, SAE Technical Paper Series 2004-01-3185, Power Systems Conference, Reno Nevada, Nov. 2-4, 2004.
Evgeni Ganev, High-Reactance Permanent Magnet Machine for High-Performance Power Generation Systems, SAE Technical Paper Services 2006-01-3076, Power Systems Conference, New Orleans Louisiana, Nov. 7-9, 2006.
Mike Koerner et al., An Electric Power Generation System for Launch Vehicles, SAE Technical Paper Series 2006-01-3061, Power Systems Conference, New Orleans, Louisiana Nov. 7-9, 2006.
Evgeni Ganev, Advanced Electric Drives for Aerospace More Electric Architectures, SAE Technical Paper Series 2008-01-2861, Power Systems Conference, Bellevue Washington, Nov. 11-13, 2008.
Evgeni Ganev, et al., Speed Control Method for Turboelectric Power Generation Systems, SAE Technical Paper Series 2008-01-2902, Power Systems Conference, Bellevue Washington, Nov. 11-13, 2008.
Simon Yu, et al., Next Generation Power and Thermal Management System, SAE Technical Paper Series 2008-01-2934, Bellevue Washington, Nov. 11-13, 2008.

* cited by examiner

*Primary Examiner* — Tran Nguyen
*Assistant Examiner* — Michael Andrews
(74) *Attorney, Agent, or Firm* — Kinney & Lange, P.A.

(57) ABSTRACT

A power unit connected to a power distribution bus operates in one of several modes to either store excess electrical energy from the power distribution or supply electrical energy to the power distribution bus to account for a detected demand/need. The power unit includes turbomachinery having components connected via a shaft, a generator connected to convert rotational energy associated with the turbomachinery to electrical energy for distribution on the bus, and a motor connected to convert electrical energy distributed by the bus to motive energy used to accelerate the turbomachinery components. A power controller monitors the voltage on the distribution bus. In response to excess voltage on the distribution bus, the power controller connects the motor to the bus to cause the excess electrical energy to be converted to motive energy that is used to accelerate the turbomachinery. In response to a voltage shortage on the distribution bus, the power controller connects the generator to the bus to convert rotational energy stored by the turbomachinery to electrical energy that is supplied to the bus.

7 Claims, 2 Drawing Sheets

INTEGRATED POWER UNIT AS ENERGY STORAGE DEVICE FOR ELECTRICAL POWER SYSTEM

BACKGROUND

The present invention relates generally to electrical power systems, and in particular to an integrated power unit for storing and supplying power to electrical systems on-board an aircraft.

Typical aircraft systems employ several sources of electrical power, each source providing a particular utility during different stages of flight. For instance, an aircraft may employ batteries, an integrated power pack (IPP), and main engines for generation of electrical power. In a typical system, the batteries supply electrical power to the IPP when the aircraft is on the ground. The IPP uses the electrical energy provided by the battery to rotate turbomachinery associated with a gas turbine engine to speeds sufficient for light-off of the gas turbine. Following light-off, the gas turbine associated with the IPP is accelerated to a self-sustaining speed at which point battery power is removed. Rotational energy provided by the combustion of the gas turbine is converted to electrical energy by a generator and distributed to electrical loads associated with the aircraft. In particular, electrical energy provided by the IPP is typically employed to provide starting power to the main engines. Electrical energy provided by the IPP is converted by a motor to rotational energy that is used to accelerate the main engine to speeds sufficient for light-off of the main engine. Following successful light-off of the main engine, the IPP may be shut-down, with a generator coupled to the main engine providing the electrical energy consumed by the aircraft.

In addition to these desired sources of power, many aircraft employ electrical loads that may contribute electrical energy to the distribution system. Electric motors used to convert electrical energy provided by the distribution system to mechanical energy to drive a mechanical load, such as aircraft flight control surfaces, may themselves be driven by the load such that the motor operates as a generator and provides electrical energy back onto the distribution bus. The electrical energy provided by some of the loads may result in substantial spikes in voltage provided onto the distribution bus. Typical systems dissipate this excess electrical power by converting it to heat. It would be beneficial if this excess energy could be stored rather than merely dissipated.

SUMMARY

A power unit connected to a power distribution bus operates in one of several modes to either store excess electrical energy from the power distribution or supply electrical energy to the power distribution bus to account for a detected need/demand. The power unit includes turbomachinery having components connected via a shaft, a generator connected to convert rotational energy associated with the turbomachinery to electrical energy for distribution on the bus, and a motor connected to convert electrical energy distributed by the bus to motive energy used to accelerate the turbomachinery components. A power controller monitors the voltage on the distribution bus. In response to excess voltage on the distribution bus, the power controller connects the motor to the bus to cause the excess electrical energy to be converted to motive energy that is used to accelerate the turbomachinery. In response to a voltage shortage on the distribution bus, the power controller connects the generator to the bus to convert rotational energy stored by the turbomachinery to electrical energy that is supplied to the bus.

DETAILED DESCRIPTION

The present invention employs a power unit that includes turbomachinery, a motor, and a generator to store excess electrical energy detected on a distribution bus to motive force that is stored as rotational energy in the turbomachinery of the power unit, and supplies electrical energy onto the distribution bus by converting the stored rotational energy to mechanical energy in response to detected shortages of electrical energy on the distribution bus.

Figure 1:
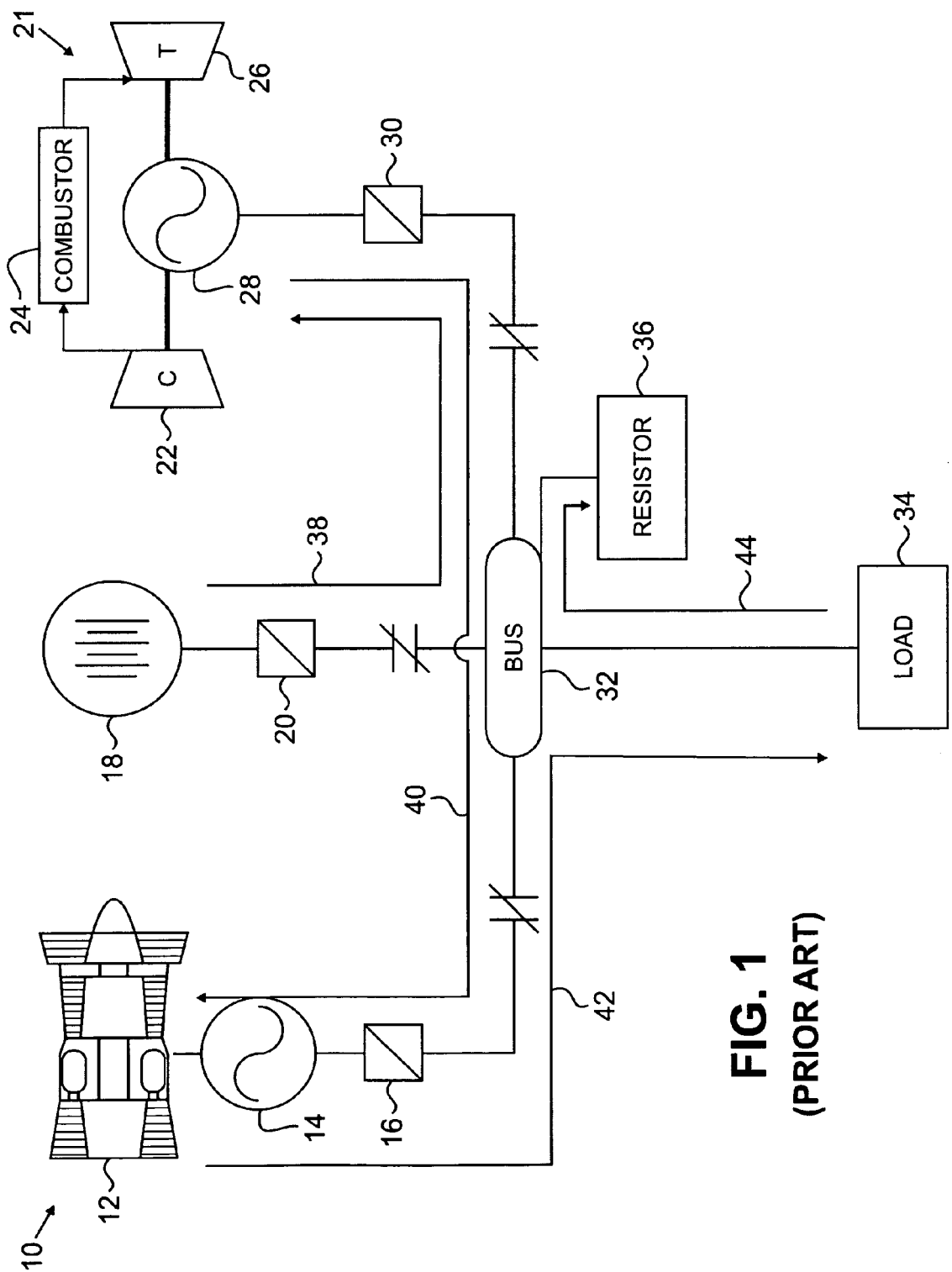
FIG. 1 is a block diagram illustrating an electrical power distribution system as known in the prior art.

FIG. 1 is a block diagram illustrating electrical power distribution system 10 as known in the prior art. System 10 includes main engine 12, alternating-current (AC) generator 14, power conditioner circuit 16, direct-current (DC) battery 18, power conditioner 20, integrated power pack (IPP) 21, power conditioner 30, bus 32, load 34 and resistor 36. IPP 21 includes compressor 22, combustor 24, turbine 26, and AC generator 28. The flow of power between devices is indicated by arrowed lines 38, 40, 42 and 44. Battery 18 provides electrical power 38 to IPP 21, electrical power 40 is provided from IPP 21 to main engine 12, electrical power 42 is provided from main engine 12 to electrical load 34, and electrical power 33 is provided from electrical load 34 to resistor 36.

Power generation components, including main engine 12, battery 18, and IPP 21, each act to supply or receive electrical power during different stages of operation. In pre-flight operations, before starting main engine 12, battery 18 supplies electrical power 38 used to initiate starting of IPP 21. Electrical power 38 is converted to motive power by a dedicated starter motor (not shown) or by a hybrid starter-generator (e.g., AC generator 28) that accelerates IPP 21 to a speed conducive to light-off. This requires the motor to rotate compressor 22 at a speed that provides a desirable fuel/air mixture to combustor 24. Subsequent to light-off, IPP 21 is self-sustaining such that exhaust provided by combustor 24 provides motive energy to turbine 26, which in turn provides motive force to compressor 22. At this point, battery 18 ceases to provide electrical power.

At a subsequent stage, motive force provided by a self-sustaining IPP 21 is converted to electrical energy by AC generator 28 and power conditioner 30. In particular, electrical power 40 generated by IPP 21 is provided to aid in starting main engine 12, which once again requires a starter motor (either dedicated or a hybrid starter-generator) to convert the provided electrical power to motive force used to accelerate the main engine to a speed conducive to light-off. Subsequent to starting main engine 12, IPP 21 is typically turned 'off' (i.e., no longer generates motive force through combustion) such that IPP 21 does not provide electrical power onto bus 32.

Motive force provided by a self-sustaining main engine 12 is converted to electrical energy by AC generator 14 and power conditioner 16. In particular, main engine 12 provides electrical power 42 to electrical loads (e.g., load 34), which may include electrical motors used to provide motive force to mechanical loads (such as flaps employed on the exterior of the aircraft).

A load including an electric motor has the potential to generate electrical energy when motive force provided by the load (e.g., flaps) acts to drive the motor. In principle, motors and generators are structurally the same, with only the direction of power determining whether a device is operating as a motor (converting electrical energy to mechanical energy) or a generator (converting mechanical energy to electrical energy). Thus, a motor connected to drive mechanical loads such as aircraft flight control surfaces may be driven as a generator when the flaps provide motive force back onto the motor. As a result, load 34 may generate electrical energy that is provided back onto bus 32. In some cases, the electrical energy provided by load 34 may be significant, resulting in a spike of power provided on bus 32. If not accounted for, this spike in energy may damage components (e.g., other loads) connected on bus 32. To this end, prior art electrical systems, such as that shown in FIG. 1, include components designed to dissipate this energy. In the example shown in FIG. 1, resistor 36 is connected to dissipate electrical energy provided by load 34 in the form of heat (i.e., the electrical energy is converted to heat). Typically, a controller and switch are employed to actively connect resistor 36 onto bus 32 in response to detected power spikes.

While this solution prevents power spikes from damaging components connected on bus 32, the solution fails to take advantage of an additional power source that may otherwise be used to the benefit of the system.

Figure 2:
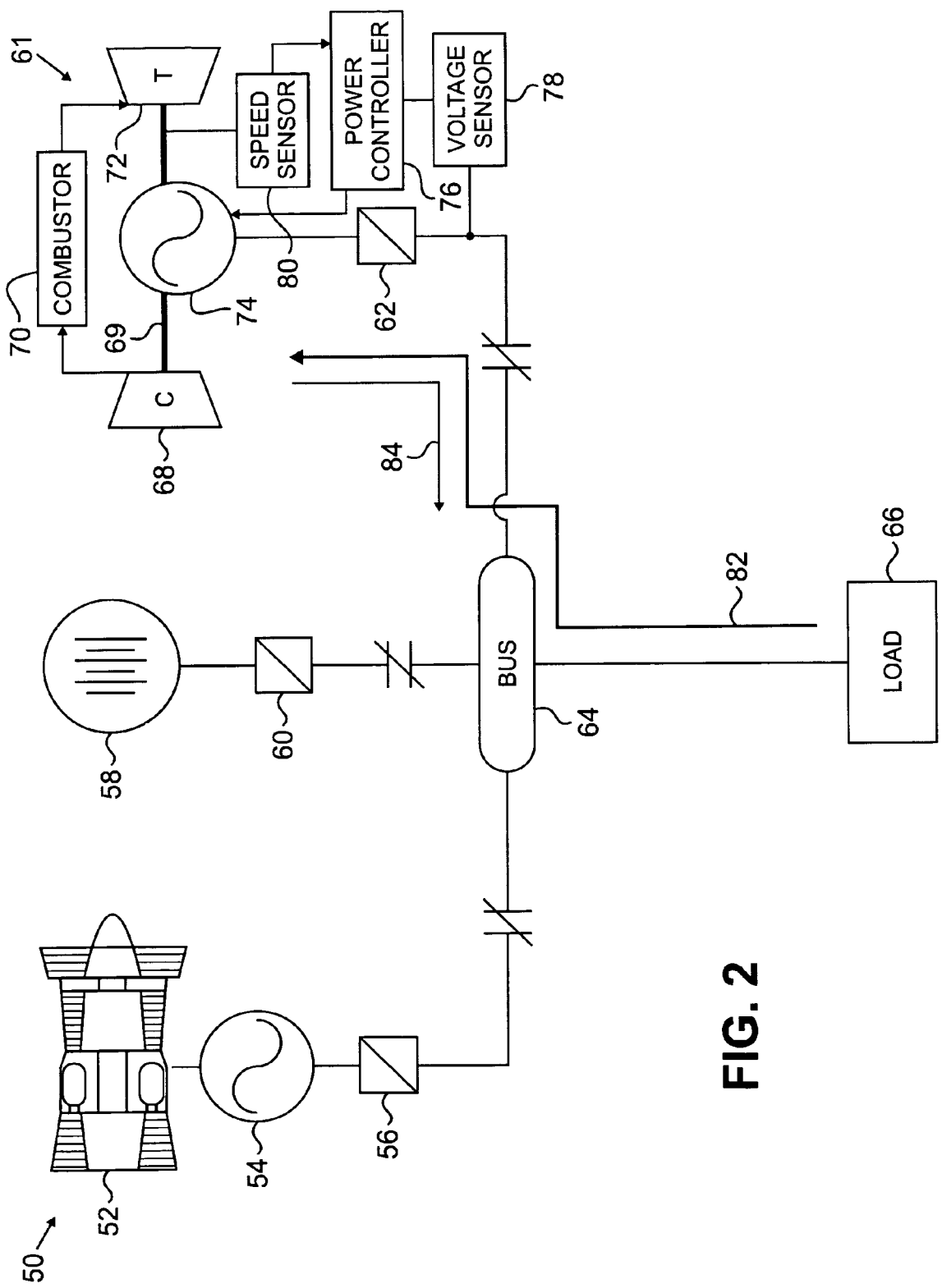
FIG. 2 is a block diagram illustrating an electrical power distribution system according to an embodiment of the present invention.

FIG. 2 is a block diagram illustrating an electrical power distribution system according to an embodiment of the present invention. System 50 includes main engine 52, alternating-current (AC) motor/generator 54, power conditioner circuit 56, direct-current (DC) battery 58, power conditioner 60, integrated power pack (IPP) 61, power conditioner 62, bus 64, and load 66. IPP 61 includes compressor 68, combustor 70, turbine 72, AC generator 74, power controller 76, voltage bus sensor 78, and speed sensor 80. Power flow remains approximately the same between the prior art system described with respect to FIG. 1 and the embodiment shown in FIG. 2, except that instead of dissipating electrical energy generated by electrical load 66 through a resistor, the electrical energy 82 is communicated to IPP 61. In particular, IPP 61 converts the excess electrical energy 82 to mechanical energy that is "stored" in the rotational energy of IPP 61 (i.e., the converted mechanical energy is absorbed by the turbomachinery associated with IPP 61, thereby "storing" the converted energy in the rotation of IPP 61). Subsequently, the stored rotational energy may be returned to the system in the form of electrical energy 84 for consumption by one or more attached loads.

IPP 61 is therefore capable of operating in one of several modes of operation. In a first mode (i.e., combustion mode), IPP 61 generates motive force through combustion that is converted to electrical energy and supplied to bus 64. In a second mode (i.e., storage mode), IPP 61 receives excess electrical energy generated by load 66, converts the electrical energy to motive force, and stores the energy in rotational, kinetic energy associated with rotating turbomachinery of IPP 61 (i.e., in the rotation of compressor 68, turbine 72 and AC generator 74). In the third mode (i.e., supply mode), energy stored in the form of rotationally energy is converted to electrical energy and provided onto bus 72.

In this embodiment, AC motor/generator is described as a single device capable of operating in either a motoring mode (i.e., converting electrical energy to motive energy) or a generator mode (i.e., converting motive energy to electrical energy). In other embodiments, an individual AC motor and individual AC generator may replace the hybrid device described in this embodiment. In these embodiments, rather than power controller 76 selectively determining the mode in which AC motor/generator 74 operates, controller 76 would selectively connect either the motor or the generator to the distribution bus to selectively store or supply electrical energy.

Combustion Mode

When operating in the combustion mode, IPP 61 operates as described in the prior art. Compressor 68, turbine 72 and AC generator 74 are rotatably connected via shaft 69. When self-sustaining (i.e., after successful light-off), compressor 68 provides compressed air to combustor 70, where it is mixed with fuel to generate a fuel-air mixture suitable for combustion. The expanding gas generated as a result of the combustion (i.e., the working gas) is provided through turbine 72, wherein the expanding gas is converted to mechanical energy that causes turbine 72 to rotate. The rotation provided to turbine 72 is communicated via shaft 69 to compressor 68 and AC generator 74. The rotation communicated to compressor 68 provides additional airflow into combustor 70, resulting in sustainable combustion. The rotation communicated to AC generator 74 results in the generation of electrical energy (not labeled, to avoid confusion with the power generated in the supply mode) provided onto bus 64.

Storage Mode

When operating in the storage mode, IPP 61 is not sustaining combustion. However, IPP 61 may receive bleed air from main engine 52 that provides some motive force to IPP 61 to operate loads such as environmental control system (ECS). Due to the mechanical force provided by the bleed air, turbomachinery associated with IPP 61 typically includes at least a threshold level of rotational energy.

Excess electrical energy provided onto bus 64, typically as a result of mechanical loads driving motors as generators for short periods of time, is "stored" as rotational energy in the turbomachinery associated with IPP 61. In particular, AC motor/generator (operating in a motoring mode) converts the excess electrical energy 82 to motive force used to accelerate the turbomachinery associated with IPP 61. In this way, excess electrical energy 82 is not merely dissipated, but stored for subsequent use.

In one embodiment, power controller 76 monitors the voltage level associated with bus 64 (via voltage sensor 78 or a voltage sensor internal to power controller 76) to determine whether excess energy is available for storage onto the turbomachinery of IPP 61. In response to a monitored bus voltage indicating excess power available on bus 64 (e.g., monitored bus voltage exceeds a threshold value), power controller 76 electrically connects AC generator/motor 74 to DC bus 64 and causes AC motor/generator 74 to operate in a motor mode. In response, excess electrical energy 82 is converted to mechanical energy by AC motor/generator 74 and stored as kinetic energy in the rotating turbomachinery of IPP 61.

Storage of the excess electrical energy 82 to IPP 61 reduces the voltage on bus 64. In response to the monitored voltage levels dissipating below excessive levels, power controller 76 disconnects AC motor/generator 74. In this way, excess electrical energy is not merely dissipated, but stored.

Detection of excess energy available for storage is based on the monitored voltage. Power controller 76 may make use of a detection algorithm that includes voltage thresholds for distinguishing between useful voltage spikes that can be converted to mechanical energy for storage in IPP 61 and ordinary voltage fluctuations that are handled by voltage regulation circuits/algorithms.

Supply Mode

When operating in the supply mode, IPP 61 is not sustaining combustion. In the event of a voltage need/demand on bus 64 (i.e., a shortage of available voltage on bus 64), rotational energy stored in the turbomachinery of IPP 61 is converted to electrical energy by AC generator 68 (operating in a generator mode), and power conditioner 70 converts the AC power to DC power for supply to bus 72. In one embodiment, a voltage need/demand is detected based on the monitored voltage falling below a threshold value(s).

Rotational energy stored in the rotating turbomachinery of IPP 61 may be subsequently returned to the system in the form of electrical energy 84. In one embodiment, power controller 76 monitors the voltage level associated with bus 64 (via voltage sensor 78) to determine whether a need/demand for electrical energy exists on bus 64. In response, power controller 76 connects AC motor/generator 74 (operating in the generator mode) to bus 64. Rotational energy stored in the turbomachinery of IPP 61 is converted to electrical energy by AC motor/generator and provided onto bus 64 for distribution to connected loads (e.g., load 66).

In one embodiment, power controller 76 receives input from speed sensor 80, which monitors the speed of shaft 69. The speed input is indicative of rotational energy stored (and therefore available for distribution) by IPP 61. If the speed input is too low (e.g., falls below a threshold value), then IPP 61 does not contain stored energy available for distribution on DC bus 64. In this way, the monitored speed may be used as an indicator of the power available from IPP 61.

Although the present invention has been described with reference to preferred embodiments, workers skilled in the art will recognize that changes may be made in form and detail without departing from the spirit and scope of the invention. In particular, the embodiment shown with respect to FIG. 2 described a particular type of power unit (namely, the integrated power pack). In other embodiments, any type of general power unit that includes turbomachinery, a motor, and a generator may be used to selectively store/supply energy from/to the distribution bus. For example, the present invention may also be used in conjunction with auxiliary power units (APUs) commonly found on commercial aircraft.

The invention claimed is:

1. A power unit comprising:
   turbomachinery components rotatably connected via a shaft;
   a generator connected to convert rotational energy associated with the turbomachinery to electrical energy for distribution on a electrical bus;
   a motor connected to convert electrical energy distributed by the electrical bus to motive energy used to accelerate the turbomachinery components; and
   a power controller operably connectable to monitor voltage on the electrical bus and configured to detect, based on the monitored voltage, whether the excess voltage is a result of regenerative power provided by a load attached to the electrical bus;
   wherein, based on detecting that the excess voltage is resulting from regenerative power, the power controller selectively connects the motor to the electrical bus to convert the excess electrical energy to motive force used to accelerate the turbomachinery components, and based on detecting a voltage demand on the electrical bus the power controller selectively connects the generator to the electrical bus to convert rotational energy associated with the turbomachinery components to electrical energy for distribution on the electrical bus.

2. The power unit of claim 1, wherein the generator and the motor are included within a hybrid AC motor/generator device, wherein the power controller determines whether the AC motor/generator device operates in a motoring mode or a generating mode based on the monitored voltage on the electrical bus.

3. The power unit of claim 1, further including:
   a speed sensor connected to monitor a speed associated with the turbomachinery components, wherein the speed sensor provides a speed input to the power controller representative of the rotational energy stored by the turbomachinery components.

4. A method of controlling the power unit of claim 1, the method comprising:
   monitoring voltage on the electrical bus;
   controlling the power unit to operate in a storage mode in response to the monitored voltage exceeding a first threshold value, wherein the power unit converts electrical energy to motive force that accelerates the turbomachinery associated with the power unit, thereby storing rotational energy in the turbomachinery; and
   controlling the power unit to operate in a supply mode in response to the monitored voltage falling below a second threshold value, wherein the power unit converts the rotational energy stored in the turbomachinery to electrical power that is supplied to the electrical bus.

5. The method of claim 4, wherein controlling the power unit to operate in the storage mode includes connecting the motor to the electrical bus, wherein the motor converts the excess electrical energy to motive force used to accelerate the turbomachinery.

6. The method of claim 4, wherein controlling the power unit to operate in the supply mode includes connecting the generator to the electrical bus, wherein the generator converts rotational energy associated with the turbomachinery to electrical energy that is supplied to the electrical bus.

7. The method of claim 4, further including:
   monitoring a speed associated with the turbomachinery; and
   determining whether to operate the power unit in the supply mode based on the monitored speed.

* * * * *